(12) United States Patent
Soane et al.

(10) Patent No.: US 8,821,733 B2
(45) Date of Patent: *Sep. 2, 2014

(54) SYSTEMS AND METHODS FOR RECOVERING FINE PARTICLES FROM FLUID SUSPENSIONS FOR COMBUSTION

(75) Inventors: David Soane, Chestnut Hill, MA (US); Nathan Ashcraft, Somerville, MA (US)

(73) Assignee: Soane Mining, LLC, Cambridge, MA (US)

( * ) Notice: Subject to any disclaimer, the term of this patent is extended or adjusted under 35 U.S.C. 154(b) by 719 days.

This patent is subject to a terminal disclaimer.

(21) Appl. No.: 12/908,718

(22) Filed: Oct. 20, 2010

(65) Prior Publication Data

US 2011/0252701 A1    Oct. 20, 2011

Related U.S. Application Data

(63) Continuation-in-part of application No. 12/791,438, filed on Jun. 1, 2010, now abandoned, and a continuation-in-part of application No. 12/792,181, filed on Jun. 2, 2010, now Pat. No. 8,349,188.

(60) Provisional application No. 61/253,332, filed on Oct. 20, 2009, provisional application No. 61/246,585, filed on Sep. 29, 2009.

(51) Int. Cl.
| | |
|---|---|
| *C02F 1/54* | (2006.01) |
| *C02F 1/40* | (2006.01) |
| *C02F 1/56* | (2006.01) |
| *C10L 5/12* | (2006.01) |

(52) U.S. Cl.
CPC ... *C02F 1/40* (2013.01); *C02F 1/56* (2013.01); *C02F 2305/12* (2013.01); *C10L 5/12* (2013.01)
USPC .......................................... 210/702; 210/703

(58) Field of Classification Search
CPC ................................... C02F 1/40; C02F 1/56
USPC ......................................................... 210/703
See application file for complete search history.

(56) References Cited

U.S. PATENT DOCUMENTS

| | | | |
|---|---|---|---|
| 3,352,424 A | 11/1967 | Guebert et al. | |
| 3,723,310 A | 3/1973 | Lang et al. | |
| 3,932,275 A | 1/1976 | Mewes et al. | |
| 3,996,696 A | 12/1976 | Davidtz | |

(Continued)

FOREIGN PATENT DOCUMENTS

| | | |
|---|---|---|
| AU | 640296 | 6/1992 |
| CN | 101087733 A | 12/2007 |

(Continued)

OTHER PUBLICATIONS

U.S. Appl. No. 13/675,661, Berg et al.

(Continued)

*Primary Examiner* — Tony G Soohoo
*Assistant Examiner* — Peter Keyworth
(74) *Attorney, Agent, or Firm* — Elmore Patent Law Group, P.C.; Mahreen Chaudhry Hoda; Carolyn S. Elmore

(57) ABSTRACT

The present invention provides compositions, systems and methods for using coal from coal processing sources to remove coal fines from a mixture and form a coal-on-coal composite particle.

8 Claims, 2 Drawing Sheets

(56) References Cited

U.S. PATENT DOCUMENTS

| | | | |
|---|---|---|---|
| 4,346,010 A | | 8/1982 | Ogino et al. |
| 4,363,749 A | | 12/1982 | Weiss et al. |
| 4,498,993 A | | 2/1985 | Raba, Jr. et al. |
| 4,569,768 A | | 2/1986 | McKinley |
| 4,597,770 A | * | 7/1986 | Forand et al. ............ 44/280 |
| 4,882,066 A | | 11/1989 | Portier |
| 4,913,585 A | | 4/1990 | Thompson et al. |
| 5,073,272 A | | 12/1991 | O'Neill et al. |
| 5,190,660 A | | 3/1993 | Lindoy et al. |
| 5,330,546 A | * | 7/1994 | Ramesh et al. ............ 44/620 |
| 5,393,435 A | | 2/1995 | Deans et al. |
| 5,433,865 A | | 7/1995 | Laurent |
| 5,453,206 A | | 9/1995 | Browne |
| 5,543,056 A | | 8/1996 | Murcott et al. |
| 5,798,046 A | | 8/1998 | Greer et al. |
| 6,042,732 A | | 3/2000 | Jankowski et al. |
| 6,203,711 B1 | | 3/2001 | Moffett |
| 6,214,237 B1 | | 4/2001 | Kustra et al. |
| 6,890,431 B1 | | 5/2005 | Eades et al. |
| 6,919,031 B2 | | 7/2005 | Blumenschein et al. |
| 7,001,525 B2 | | 2/2006 | Binot et al. |
| 7,153,436 B2 | | 12/2006 | Bair et al. |
| 7,255,793 B2 | | 8/2007 | Cort |
| 7,901,583 B2 | | 3/2011 | McColl et al. |
| 8,187,470 B2 | | 5/2012 | Wang et al. |
| 8,353,641 B2 | | 1/2013 | Berg et al. |
| 2002/0139754 A1 | | 10/2002 | Miller |
| 2004/0116304 A1 | | 6/2004 | Wu et al. |
| 2006/0006116 A1 | * | 1/2006 | Scheimann et al. ......... 210/728 |
| 2006/0151360 A1 | | 7/2006 | Wright et al. |
| 2007/0085055 A1 | | 4/2007 | Sikes et al. |
| 2007/0209971 A1 | | 9/2007 | Duyvesteyn et al. |
| 2007/0289911 A1 | | 12/2007 | Cymerman et al. |
| 2009/0206040 A1 | | 8/2009 | Berg et al. |
| 2010/0098493 A1 | | 4/2010 | McColl et al. |
| 2012/0061321 A1 | | 3/2012 | Soane et al. |
| 2012/0067824 A1 | | 3/2012 | Berg et al. |

FOREIGN PATENT DOCUMENTS

| | | |
|---|---|---|
| WO | 2004/060819 A1 | 7/2004 |
| WO | 2006047225 A2 | 5/2006 |
| WO | 2010098786 A1 | 9/2010 |

OTHER PUBLICATIONS

U.S. Appl. No. 13/706,586, Soane et al.
U.S. Appl. No. 13/788,936, Soane et al.
U.S. Appl. No. 12/846,021, Kincaid et al.
U.S. Appl. No. 12/792,181, Soane et al.
"Actiflo™ Process : Key to Efficient High-Rate Clarification," available online at http://www.veoliawaterst.com/indepth/mining_fluent/13262,actiflo_process.htm.
Muylwyk, Q., et al., "Practical experiences in sand ballasted clarification processes," Proceedings of the Annual Conference of the Western Canada Water and Wastewater Association, Abstract (2004).
Blumenschein, C. D., et al., "Sand Ballasted High Rate Clarification Process for Treatment of Process Water," available online at http://web.cecs.pdx.edu/~fishw/UO_Ballast-Actiflo.pdf. Oct. 2006.
Zhang, et al. "Development of an Ultra-fine Coal Dewatering Technology and an Integrated Flotation-Dewatering System for Coal Preparation Plants". DOE Grant Final Report. Mar. 1, 2007.

* cited by examiner

SYSTEMS AND METHODS FOR RECOVERING FINE PARTICLES FROM FLUID SUSPENSIONS FOR COMBUSTION

RELATED APPLICATION

This application claims the benefit of U.S. Provisional Application No. 61/253,332, filed on Oct. 20, 2009. This application is a continuation-in-part of U.S. application Ser. No. 12/791,438, filed on Jun. 1, 2010, and a continuation-in-part of U.S. Application Ser. No. 12/792,181, filed on Jun. 2, 2010, both of which claim the benefit of U.S. Provisional Application No. 61/246,585, filed on Sep. 29, 2009. The entire teachings of the above application are incorporated herein by reference.

PARTIES TO A JOINT RESEARCH AGREEMENT

Soane Mining, LLC and Soane Energy, LLC are parties to a "joint research agreement" as defined in 35 U.S.C. 103 (c)(3).

FIELD OF APPLICATION

This application relates generally to systems and methods for forming combustible coal pellets.

BACKGROUND

Coal as it is recovered from the mine (termed "run-of-mine" or ROM coal) comes in a variety of sizes and shapes and contains mineral impurities from which it must be separated. Preparing the ROM coal for other uses, involving processes known as coal preparation or cleaning, aims to sort the coal according to size, and aims to separate it from its mineral content. The mineral content of coal is the noncombustible inorganic fraction, comprised of minerals that are either detrital or authigenic in origin and that are introduced into the coal in the first or second phases of coalification. Minerals can be found in the ROM coal as combinations of larger inclusions within the coal lumps and ultrafine crystals disseminated throughout the coal lumps.

As a first step in coal cleaning, the coal is crushed to reduce its size and to free it up from the larger mineral inclusions. Assisting in this process is the fact that the coal tends to break more easily than the minerals, so that the coal can be liberated from some of the surrounding minerals by size reduction techniques using crushers, rotary breakers or other similar devices. Size differences are exploited to sort the crushed coal into different categories of pellet sizes, some of which can be used immediately if the coal is of sufficient quality. In addition, the larger lumps of coal (~10-150 mm in length) can be treated with a technology called dense-medium separation, where the organic coal is floated free of impurities by immersing the crushed material in a high-density liquid; because the coal is less dense, it floats to the surface, while the heavier mineral matter will sink to be removed as waste.

Further crushing may be necessary if the coal is more intimately associated with minerals. The smaller-sized coal fragments can then be treated with froth flotation to separate the coal from the minerals that surround it. Using this technique, fine coal fragments can be mixed with water and other additives, then exposed to streams of air bubbles. The coal is carried to the surface in the froth, where it can be skimmed off, screened and dewatered for commercial uses, while the minerals sink to the bottom. The dewatered mass of fine coal obtained through this process is termed FC, for "filter cake." Coal particles in the filter cake are typically about the size of sand particles.

The mineral material separated from the coal during these processes is dewatered, using for example vibratory screens, and then compacted for disposal or for further mineral recovery efforts. This waste mineral material is called coal refuse, or coal processing refuse (CPR). Depending on the type and source of the coal, the ratio of CPR to filter cake can be as high as 5:1 by weight. It may contain particles that range from microns in size to millimeters in size. The CPR may be further treated to remove useful minerals from it, or it may be disposed of as a waste material.

After these water-driven separation processes, fine particles remain in the slurry, called "fines," which can include inorganic and organic materials (coal, clay, minerals, and the like). The fines that are coal particles can be termed "coal fines." Separating the coal fines from the suspending medium is difficult, as the fines tend to remain suspended unless energy-intensive processes are employed to recover them. In coal mining and processing, significant quantities of coal fines are created that require disposal and handling.

The amount of coal fines in the slurry stream will vary by site depending on the efficiency of the coal processing facility. Other fines in the slurry include clays and fine mineral materials. Treating the slurry to remove all suspended solids and recover clarified water is a difficult problem. Additionally, it is highly desirable to recover the high value coal fines from the slurry. Older, less efficient coal processing facilities tend to have larger quantities of valuable coal fines ending up in the slurry stream. To increase the overall efficiency of coal processing, the ability to selectively recover the valuable coal fines from the slurry is needed. Recovering the coal-rich fines from the slurry by mechanical means is difficult, expensive, and inefficient.

Coal fines can be converted into pellets to facilitate disposal, transportation and handling. Coal-fired power plants can burn coal pellets as the fuel of choice. Pelletizing the coal fines generally requires adding an adhesive binder to the slurry containing coal fines, and using high temperatures or pressures to form the dry, consolidated pellets. Such steps are typically employed to agglomerate coal because coal particles do not naturally adhere to each other unless particle size is carefully controlled and extremely high pressures are used (over 20,000 psi for bituminous coal, for example). As an alternative to high pressure, an adhesive binder such as asphalt can be applied to bind the coal particles together. The adhesive can be expensive itself, and its use requires that a system incorporate equipment specifically to prepare and meter the adhesive, adding additional expense.

Pellet manufacture presently requires both shaping and drying. Water-soluble or water-dispersible binders are difficult to dry, and the resulting pellets are difficult to dewater. Once in pellet form, the coal product is densely consolidated, so that oxygen for combustion penetrates with difficulty. In other words, the high interfacial area characteristic of fines is drastically reduced by pellet formation, and the great combustion efficiency inherent in powder burning is lost.

Currently, then, pelletization permits fines to be disposed of in a form that is useful for combustion purposes and convenient for transport and handling. However, the pellets do not burn efficiently in a combustion chamber. It is known in the art to coat wet pellets with a hydrophobic material during processing so that residual water is trapped in the interior of the pellet; when such pellets are introduced into a boiler, the interior water vaporizes rapidly so that the pellet bursts, releasing powdered coal for combustion. However, the high heat of vaporization for water lowers the overall power output of a plant using such technology. In addition, a coating step is required, adding to the expense of manufacturing. There remains a need in the art, therefore, to offer a pelletizing process that improves upon conventional processes by enhancing efficiency of combustion and ease of handling.

In addition to coal fines waste, an enormous amount of biomass waste is generated annually. Wood waste is produced by lumber mills, for example, with wasted wood accounting for about ten percent of processed lumber. Wood waste can also be found in forests as deadwood, living biomass, or residua from timber harvesting. Lignocellulosic waste is produced by agriculture (e.g., corn stalks, wheat, hays, grasses, sugar cane bagasse, soybeans) and by processing (e.g., cotton gins). Feathers remaining from poultry farming require disposal as waste. Waste from animal husbandry includes organic material such as manure, feedstock and bedding. Additional organic waste is produced by cattle, hog, chicken, turkey and fish farming. Industrial products such as carpeting and automobile tires end up as waste that must be disposed of.

It is known in the art to form combustible organic waste materials into pellets, so that such biomass can be disposed of by combustion to generate energy. U.S. Pat. No. 6,506,223 discloses technologies for forming biomass waste material into useful combustible products. It is also known to combine biomass liquefaction products with waste coal fines to create combustible pellets, as disclosed in U.S. Pat. No. 5,916,826. There remains a need in the art, however, for improved techniques of forming combustible pellets that optimize combustion efficiency. It is further desirable to provide for disposal of both coal fines waste and biomass waste in a combustible pelletized product.

SUMMARY

The present invention relates to methods, systems and compositions for removing fines, such as coal fines, from a mixture. The invention further relates to compositions, such as pellets, that are produced using the methods of the invention.

In an embodiment, the invention provides A system for removing coal fines from a fluid, comprising a fluid containing a population of suspended coal fines, an activator polymer added to the fluid to complex with the suspended coal fines to form activated coal fines, the activated coal fines residing within the fluid volume, an anchor particle complexed with a tethering agent to form tether-bearing anchor particles, the tether-bearing anchor particles being mixed with the fluid volume to contact the activated coal fines, the tether-bearing anchor particles being capable of complexing with the activated coal fines to form complexes removable from the fluid, where the complexes removable from the fluid comprise a composite material comprising complexed coal fines and anchor particles. In one embodiment, the anchor particle comprises coal.

In an embodiment, the invention provides a method for removing coal fines from a fluid, comprising the steps of: (a) providing an activator polymer capable of interacting with a population of coal fines suspended in a fluid; (b) adding the activator polymer to the population to form activated coal fines; (c) providing an anchor particle; (d) complexing the anchor particle with a tethering agent capable of complexing with the activated coal fines, thereby forming tether-bearing anchor particles; (e) mixing the tether-bearing anchor particles with the activated coal fines to form a complex removable from the fluid, the complex comprising a composite material comprising coal fines and anchor particles; and (f) removing the composite material from the fluid. In one embodiment, the anchor particle comprises coal.

In an embodiment, the invention provides an energy-bearing pellet, comprising a composite material comprising an energy-containing fine material and a combustible anchor particle in a complex, the complex further comprising an interacting pair of polyelectrolytes, wherein the first of the pair of polyelectrolytes is bound to the energy-containing fine material and the second of the pair of polyelectrolytes is bound to the combustible anchor particle. In a preferred embodiment, the energy-containing fine material comprises coal. In certain embodiments, the energy-bearing pellet is produced using a method of the invention.

DETAILED DESCRIPTION

Figure 1:
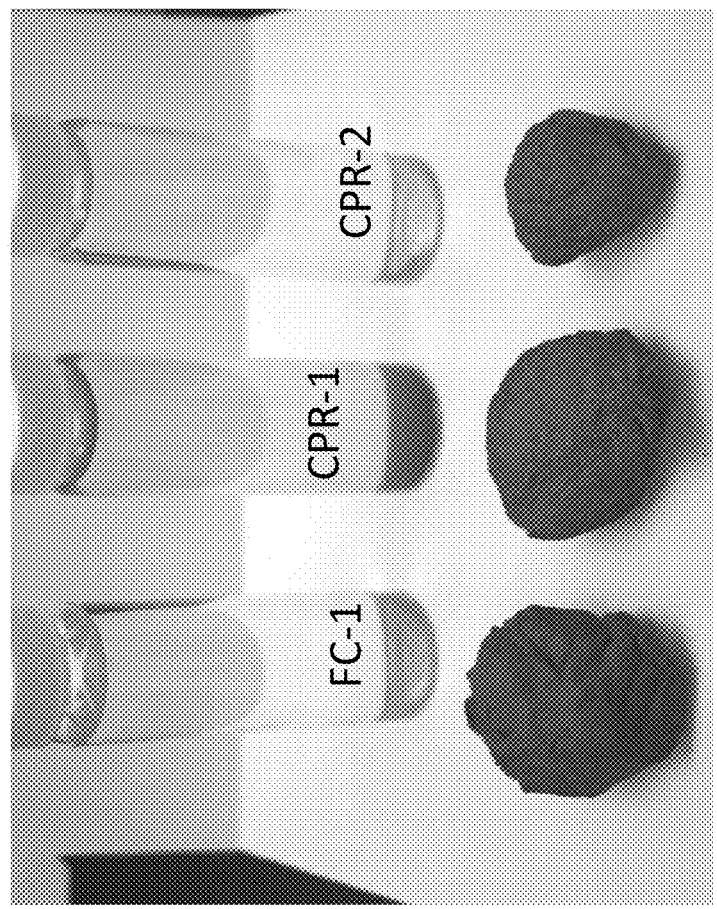
FIG. 1 shows the results of the experiment performed in Example 11.

Disclosed herein are systems and methods for using coal from coal processing sources to remove coal fines from a mixture and form a coal-on-coal composite particle. In embodiments, coal from filter cake can be used to attract, consolidate and/or organize coal fines in mixtures, thereby forming a composite particle substantially formed from coal. Such a composite particle, advantageously, can be an efficient source of energy. In embodiments, composite coal-on-coal particles can be formed that are then combined with other adulterants such as sand, minerals or water to decrease the energy content of the final product. Such modification may be carried out, for example, to meet the specifications of a particular customer for an energy source delivering a known quantity of energy. In certain cases, for example, a customer's contract calls for receiving a coal-based energy source that provides 1200 BTU per ton; if the composite coal-on-coal particle pellets provide 1300 BTU per ton, they can be adulterated so that the delivered energy content is less.

Disclosed herein are systems and methods for using particulate waste material from coal processing to remove coal fines from a mixture and form a composite particle. In embodiments, waste materials such as that found in CPR or other mineral wastes can be used to attract, consolidate and/or organize coal fines in mixtures, forming composite particles with the coal fines that put the waste materials to beneficial uses. In embodiments, these systems and methods have the advantage of using materials (whether energy-yielding like the coal in filter cake or non-energy-yielding like the minerals in CPR or other waste materials) that are found abundantly on site where coal is mined and processed.

In accordance with these systems and methods, FC and CPR can be used as anchoring particles for treating coal fines dispersed in slurries in a process that is rapid and robust, yielding clarified water and geotechnically stable solids that are easy to handle and stackable. These systems and methods can result in near-immediate recovery of coal fines from aqueous suspensions, producing solids that have very low initial (i.e., pre-drying) moisture levels. Sequestration of coal fines as composite particles with CPR can allow stockpiling and disposal of this waste material. Sequestration of coal fines as composite particles with FC can produce combustible pellets that can convert energy sources now discarded into useable fuel.

Disclosed herein are systems and methods for pelletizing coal to yield pellets that are dense during handling and transport, but that combust efficiently and completely. In preparing pellets from coal fines in accordance with these systems and methods, dewatering takes place spontaneously, rapidly and substantially completely; in embodiments, heat and/or pressure is not required. The dewatering process exploits strong molecular forces between charged species.

In embodiments, the pellets can become porous upon exposure to heat, achieving the high combustion efficiency found in powdery fuel. In such embodiments, the porosity can be imparted due to heat-induced foaming of components within the pellet matrix. The disclosed systems and methods can produce a pellet comprising components that expand upon heating, creating interior pores and channels that allow oxygen penetration. Such a highly perforated and expanded structure can optimize combustion. The self-expanding feature of the pellets contributes to combustion efficiency by virtue of its behavior as a de facto oxygenator. In embodiments, oxygen for combustion with the pellets can be taken up by coal particle surfaces by diffusion through the heat-induced porosity of the pellet matrix, and by fragmentation of the matrix structure.

Pellets in accordance with these systems and methods are suitable for use in, for example, power generation facilities. The enhanced efficiency of the instant pellets can yield greater power generation, and less unwanted byproducts (e.g., various noxious effluent gases and/or colloidal solids).

In accordance with these systems and methods, pellets can be produced that are composites of coal and biomass. In embodiments, composite pellets can be formed having a self-expanding feature that creates porosity, so that the pellets can undergo efficient combustion. Finally the process consolidates coal slurry without the need of intricate mechanical assist and the expelled water is clarified. Coal fines originally dispersed in the slurry are nearly completely captured and incorporated into the pellets.

Disclosed herein are systems and methods for enhancing the settlement rate of dispersed coal fines materials by incorporating them within a coarser particulate matrix, so that coal solids can be removed from aqueous suspension as a material suitable for pelletizing. In embodiments, the systems and methods disclosed herein involve three components: preparing tether-bearing anchor particles, activating the coal fines, and complexing the activated coal fines with the tether-bearing anchor particles to form a removable complex.

In other embodiments, an additional step may be added to selectively recover the coal fines from a solution containing them along with other impurities.

1. Activation

As used herein, the term "activation" refers to the interaction of an activating material, such as a polymer, with suspended particles in a liquid medium, such as an aqueous solution. An "activator polymer" or "activator" can carry out this activation. In embodiments, high molecular weight polymers can be introduced into the particulate dispersion as Activator polymers, so that these polymers interact, or complex, with fine particles. The polymer-particle complexes interact with other similar complexes, or with other particles, and form agglomerates.

This "activation" step can function as a pretreatment to prepare the surface of the fine particles for further interactions in the subsequent phases of the disclosed system and methods. For example, the activation step can prepare the surface of the fine particles to interact with other polymers that have been rationally designed to interact therewith in an optional, subsequent "tethering" step, as described below. Not to be bound by theory, it is believed that when the fine particles are coated by an activating material such as a polymer, these coated materials can adopt some of the surface properties of the polymer or other coating. This altered surface character in itself can be advantageous for sedimentation, consolidation and/or dewatering. In another embodiment, activation can be accomplished by chemical modification of the particles. For example, oxidants or bases/alkalis can increase the negative surface energy of particulates, and acids can decrease the negative surface energy or even induce a positive surface energy on suspended particulates. In another embodiment, electrochemical oxidation or reduction processes can be used to affect the surface charge on the particles. These chemical modifications can produce activated particulates that have a higher affinity for tethered anchor particles as described below.

The "activation" step may be performed using flocculants or other polymeric substances. Preferably, the polymers or flocculants can be charged, including anionic or cationic polymers.

In embodiments, anionic polymers can be used, including, for example, olefinic polymers, such as polymers made from polyacrylate, polymethacrylate, partially hydrolyzed polyacrylamide, and salts, esters and copolymers thereof, (such as sodium acrylate/acrylamide copolymers), sulfonated polymers, such as sulfonated polystyrene, and salts, esters and copolymers thereof. Suitable polycations include: polyvinylamines, polyallylamines, polydiallyldimethylammoniums (e.g., the chloride salt), branched or linear polyethyleneimine, polymeric amines (including epichlorohydrin/dimethylamine, and epichlorohydrin/alkylenediamines), quaternary ammonium substituted polymers, such as (acrylamide/dimethylaminoethylacrylate methyl chloride quat) copolymers and trimethylammoniummethylene-substituted polystyrene, and the like. Nonionic polymers suitable for hydrogen bonding interactions can include polyethylene oxide, polypropylene oxide, polyhydroxyethylacrylate, polyhydroxyethylmethacrylate, and the like. In embodiments, an activator such as polyethylene oxide can be used as an activator with a cationic tethering material in accordance with the description of tethering materials below. In embodiments, activator polymers with hydrophobic modifications can be used. Flocculants such as those sold under the trademark MAGNAFLOC® by Ciba Specialty Chemicals can be used.

In embodiments, activators such as polymers or copolymers containing carboxylate, sulfonate, phosphonate, or hydroxamate groups can be used. These groups can be incorporated in the polymer as manufactured, alternatively they can be produced by neutralization of the corresponding acid groups, or generated by hydrolysis of a precursor such as an ester, amide, anhydride, or nitrile group. The neutralization or hydrolysis step could be done on site prior to the point of use, or it could occur in situ in the process stream.

In embodiments, a chemical or polymer may be added to enhance the selective activation of only the coal fines in the slurry. In cases, small molecules that are highly charged or polar may help to selectively disperse the clays in the slurry. These materials may include phosphate or sulfonate functional groups. A representative dispersing molecule is sodium hexametaphospate. By dispersing the clays in the slurry, these molecules can allow for coal fines to be more easily activated. Other materials added prior to activation may be hydrophobic in nature to help aggregate to coal fines. These materials may include hydrocarbon polymers, numerous oils, fatty acids, rubbers, and other hydrophobic acids.

2. Tethering

As used herein, the term "tethering" refers to an interaction between an activated fine particle and an anchor particle (as described below). The anchor particle can be treated or coated with a tethering material. The tethering material, such as a polymer, forms a complex or coating on the surface of the anchor particles such that the tethered anchor particles have an affinity for the activated fines. In embodiments, the selection of tether and activator materials is intended to make the two solids streams complementary so that the activated fine particles become tethered, linked or otherwise attached to the anchor particle. When attached to activated coal fines via tethering, the anchor particles enhance the rate and completeness of sedimentation or removal of the fine particles from the water.

In accordance with these systems and methods, the tethering material acts as a complexing agent to affix the activated coal fines to an anchor particle. In embodiments, a tethering material can be any type of material that interacts strongly with the activating material and that is connectable to an anchor particle.

As used herein, the term "anchor particle" refers to a particle that facilitates the separation of fine particles in accordance with the systems and methods disclosed herein. In embodiments, anchor particles have a density that is greater than the liquid process stream. For example, anchor particles that have a density of greater than 1.3 g/cc can be used. In embodiments, the anchor particles may have a lower density than the fluid stream, or can have a density that is less than the density of the coal fines. Alternatively, the density of the anchor particles can be greater than the density of the coal fines or activated coal fines. In embodiments, the anchor particles are substantially larger than the coal fines or the activated coal fines. In embodiments, dense particles may be selected for modification, so that they settle rapidly when complexed with the fine particulate matter in the process stream. In yet other embodiments, less dense or buoyant particles may be selected for modification, so that they rise to the fluid surface after complexing with the fine particulate matter, allowing the complexes to be removed via a skimming process rather than a settling-out process, or so that they can be readily filtered out or skimmed off. In embodiments, the anchor particles can be chosen for their low packing density or potential for developing porosity. A difference in density or particle size facilitates separating the solids from the medium.

For example, for the removal of coal fines with an approximate mean diameter less than 50 microns, anchor particles may be selected having larger dimensions, e.g., a mean diameter of greater than 70 microns. An anchor particle for a given system can have a shape adapted for easier settling when compared to the target particulate matter: spherical particles, for example, may advantageously be used as anchor particles to remove fines with a flake or needle morphology. In other embodiments, increasing or decreasing the density of the anchor particles may lead to more rapid settlement.

Suitable anchor particles can be formed from organic or inorganic materials, or any mixture thereof. Particles suitable for use as anchor particles can include organic or inorganic particles, or mixtures thereof. In referring to an anchor particle, it is understood that such a particle can be made from a single substance or can be made from a composite. For example, coal can be used as an anchor particle in combination with another organic or inorganic anchor particle. Any combination of inorganic or organic anchor particles can be used. Anchor particle combinations can be introduced as mixtures of heterogeneous materials. Anchor particles can be prepared as agglomerations of heterogeneous materials, or other physical combinations thereof. For example, an anchor particle can be formed from a particle of one type of biomass combined with a particle of another type of biomass. For example, an anchor particle can be formed from a combustible organic particle complexed, coated or otherwise admixed with other organic or inorganic anchor particle materials. As an example, a combustible organic material can be combined with particles of ungelatinized starch. In embodiments, the starch can be gelatinized during a thermal drying step, optionally with the use of an alkali, to cause binding and strengthening of the composite fuel product.

In embodiments, the organic material selected as an anchor particle can be a coal particle, for example coal derived from coal mining or processing. As an example, coal that is collected as filter cake coal (FC) can be used as anchor particles. This technology has the advantage of using materials that are readily available on-site during coal processing to treat the fines being produced there. Anchor particles can be energy-bearing (e.g., combustible) or non-energy-bearing (e.g., minerals), or combinations thereof.

In accordance with these systems and methods, inorganic anchor particles can include one or more materials such as calcium carbonate, dolomite, calcium sulfate, kaolin, talc, titanium dioxide, sand, diatomaceous earth, aluminum hydroxide, silica, other metal oxides and the like. In embodiments, the coarse fraction of the solids recovered from the coal mining process itself can be used for anchor particles. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle can comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants. Organic materials can include various forms of organic waste, including biomass and including particulate matter from post-consumer waste items such as old tires and carpeting materials.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In other embodiments, the inorganic material selected as an anchor particle can be produced during coal preparation and processing, as described above. For example, the inorganic material used as an anchor particle can be derived from the mineral waste products of coal processing, e.g., coal processing waste (CPR). Other inorganic materials available on-site (sand, etc.) can be used as anchor particles, either alone or in combination with other inorganic or organic anchor particles.

This technology has the advantage of using materials that are readily available on-site during coal processing to treat the fines being produced there.

In embodiments, plastic materials may be used as particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics may also be obtained for these uses from waste plastic, such as post-consumer waste including plastic bags, containers, bottles made of high density polyethylene, polyethylene grocery store bags, and the like. In embodiments, elastomeric materials can be used as particles. Particles of natural or synthetic rubber can be used, for example.

Advantageously, anchor particles can be selected from biomass, so that they complex with the coal fines to form a biomass-coal composite solid. Biomass can be derived from vegetable sources or animal sources. Biomass can be derived from waste materials, including post-consumer waste, animal or vegetable waste, agricultural waste, sewage, and the like. In embodiments, the biomass sourced materials are to be processed so that they form particles of an appropriate size for tethering and combining with the activated fines. Particle sizes of, e.g., 0.01-50 millimeters are desirable. Processing methods can include grinding, milling, pumping, shearing, and the like. For example, hammer mills, ball mills, and rod mills can be used to reduce oversized materials to an appropriate size. In embodiments, additives might be used in the processing of the anchor particles to improve efficiency, reduce energy requirements, or increase yield. These processing additives include polymers, surfactants, and chemicals that enhance digestion or disintegration. Optionally, other treatment modalities, such as exposure to cryogenic liquids (e.g., liquid nitrogen or solid carbon dioxide) can be employed to facilitate forming anchor particles of appropriate size from biomass. It is understood that biomass-derived anchor particles can be formed as particles of any morphology (regular or irregular, plate-shaped, flakes, cylindrical, spherical, needle-like, etc.) or can be formed as fibers. Fibrous materials may be advantageous in that they facilitate dewatering/filtration of the composite material being formed by these systems and methods, and they can add strength to such composite materials.

Vegetable sources of biomass can include fibrous material, particulate material, amorphous material, or any other material of vegetable origin. Vegetable sources can be predominately cellulosic, e.g., derived from cotton, jute, flax, hemp, sisal, ramie, and the like. Vegetable sources can be derived from seeds or seed cases, such as cotton or kapok, or from nuts or nutshells. Vegetable sources can include the waste materials from agriculture, such as corn stalks, stalks from grain, hay, straw, or sugar cane (e.g., bagasse). Vegetable sources can include leaves, such as sisal, agave, deciduous leaves from trees, shrubs and the like, leaves or needles from coniferous plants, and leaves from grasses. Vegetable sources can include fibers derived from the skin or bast surrounding the stem of a plant, such as flax, jute, kenaf, hemp, ramie, rattan, soybean husks, vines or banana plants. Vegetable sources can include fruits of plants or seeds, such as coconuts, peach pits, mango seeds, and the like. Vegetable sources can include the stalks or stems of a plant, such as wheat, rice, barley, bamboo, and grasses. Vegetable sources can include wood, wood processing products such as sawdust, and wood, and wood byproducts such as lignin.

Animal sources of biomass can include materials from any part of a vertebrate or invertebrate animal, fish, bird, or insect. Such materials typically comprise proteins, e.g., animal fur, animal hair, animal hoofs, and the like. Animal sources can include any part of the animal's body, as might be produced as a waste product from animal husbandry, farming, meat production, fish production or the like, e.g., catgut, sinew, hoofs, cartilaginous products, etc. Animal sources can include the dried saliva or other excretions of insects or their cocoons, e.g., silk obtained from silkworm cocoons or spider's silk. Animal sources can include dairy byproducts such as whey, whey permeate solids, milk solids, and the like. Animal sources can be derived from feathers of birds or scales of fish.

In embodiments, the anchor particle can be substantially larger than the coal fines that it is separating out from the process stream. For example, for the removal of fines with approximate diameters less than 50 microns, anchor particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream.

Anchor particle sizes (as measured as a mean diameter) can have a size up to few hundred microns, preferably greater than about 70 microns. In certain embodiments, macroscopic anchor particles up to and greater than about 1 cm may be suitable. Recycled materials or waste, particularly recycled materials and waste capable of combustion are particularly advantageous.

Anchor particles can be complexed with tethering agents, such agents being selected so that they interact with the polymers used to activate the coal fines. In embodiments, various interactions such as electrostatic, hydrogen bonding or hydrophobic behavior can be used to affix an activated particle or particle complex to a tethering material complexed with an anchor particle.

In embodiments, the anchor particles can be combined with a polycationic polymer, for example a polyamine. One or more populations of anchor particles may be used, each being activated with a tethering agent selected for its attraction to the activated coal fines and/or to the other anchor particle's tether. The tethering functional group on the surface of the anchor particle can be from modification using a multifunctional coupling agent or a polymer. The multifunctional coupling agent can be an amino silane coupling agent as an example. These molecules can bond to an anchor particle's surface and then present their amine group for interaction with the activated coal fines. In the case of a tethering polymer, the polymer on the surface of the particles can be covalently bound to the surface or interact with the surface of the anchor particle and/or fiber using any number of other forces such as electrostatic, hydrophobic, or hydrogen bonding interactions. In the case that the polymer is covalently bound to the surface, a multifunctional coupling agent can be used such as a silane coupling agent. Suitable coupling agents include isocyano silanes and epoxy silanes as examples. A polyamine can then react with an isocyano silane or epoxy silane for example. Polyamines include polyallyl amine, polyvinyl amine, chitosan, and polyethylenimine.

In embodiments, polyamines (polymers containing primary, secondary, tertiary, and/or quaternary amines) can also self-assemble onto the surface of the particles or fibers to functionalize them without the need of a coupling agent. For example, polyamines can self-assemble onto the surface of the particles through electrostatic interactions. They can also be precipitated onto the surface in the case of chitosan for example. Since chitosan is soluble in acidic aqueous conditions, it can be precipitated onto the surface of particles by suspending the particles in a chitosan solution and then raising the solution pH.

In embodiments, the amines or a majority of amines are charged. Some polyamines, such as quaternary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

The polymers and particles can complex via forming one or more ionic bonds, covalent bonds, hydrogen bonding and combinations thereof, for example. Ionic complexing is preferred.

As an example of a tethering material used with an anchor particle in accordance with these systems and methods, chitosan can be precipitated onto anchor particles, for example, via pH-switching behavior. The chitosan as a tether can have affinity for anionic systems that have been used to activate fine particles. In one example, partially hydrolyzed polyacrylamide polymers can be used to activate coal fines, resulting in a particle with anionic charge properties. The cationic charge of the chitosan will attract the anionic charge of the activated particles, to attach the anchor particles to the activated coal fines. In the foregoing example, electrostatic interactions can govern the assembly of the activated coal fines bearing the anionic partially-hydrolyzed polyacrylamide polymer and the cationic anchor particles complexed with the chitosan tethering material.

In embodiments, polymers such as linear or branched polyethyleneimine can be used as tethering materials. It would be understood that other anionic or cationic polymers could be used as tethering agents, for example polydiallyldimethylammonium chloride poly(DADMAC). In other embodiments, cationic tethering agents such as epichlorohydrin dimethylamine (epi/DMA), styrene maleic anhydride imide (SMAI), polyethylene imide (PEI), polyvinylamine, polyallylamine, amine-aldehyde condensates, poly(dimethylaminoethyl acrylate methyl chloride quaternary) polymers and the like can be used. Advantageously, cationic polymers useful as tethering agents can include quaternary ammonium or phosphonium groups. Advantageously, polymers with quaternary ammonium groups such as poly(DADMAC) or epi/DMA can be used as tethering agents. In other embodiments, polyvalent metal salts (e.g., calcium, magnesium, aluminum, iron salts, and the like) can be used as tethering agents. In other embodiments cationic surfactants such as dimethyldialkyl(C8-C22) ammonium halides, alkyl(C8-C22)trimethylammonium halides, alkyl(C8-C22)dimethylbenzylammonium halides, cetyl pyridinium chloride, fatty amines, protonated or quaternized fatty amines, fatty amides and alkyl phosphonium compounds can be used as tethering agents. In embodiments, polymers having hydrophobic modifications can be used as tethering agents. Tethers that can interact with aggregated coal fines can include numerous hydrophobic polymers; examples include oils, including heavy oil, fatty acids; hydrophobic acids, rubbers, including rubber emulsions, or slightly water soluble polymers such as high molecular weight polyethylene oxide.

The efficacy of a tethering material, however, can depend on the activating material. A high affinity between the tethering material and the activating material can lead to a strong and/or rapid interaction there between. A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In one embodiment, a poly(sodium acrylate-co-acrylamide) activator is matched with a chitosan tether material.

In hydrogen bonding terms, a hydrogen bond donor should be used in conjunction with a hydrogen bond acceptor. In embodiments, the tether material can be complementary to the chosen activator, and both materials can possess a strong affinity to their respective deposition surfaces while retaining this surface property.

In other embodiments, cationic-anionic interactions can be arranged between activated coal fines and tether-bearing anchor particles. The activator may be a cationic or an anionic material, as long as it has an affinity for the fine particles to which it attaches. The complementary tethering material can be selected to have affinity for the specific anchor particles being used in the system. In other embodiments, hydrophobic interactions can be employed in the activation-tethering system.

It is envisioned that the complexes formed from the tether-bearing anchor particles and the activated coal fines can be recovered and used for other applications. For example, the complexes can be rapidly separated from water and can be recovered for compaction into coal pellets to be used for combustion. When a combustible anchor particle is selected, the entire coal-anchor complex can be used for energy production. Other anchor particles can be selected to form specialized composites with the activated coal fines, as disclosed below in more detail.

3. Specialized Composite Formation

Composites can be formed with coal fines by selecting anchor particles having particular properties. For example, selecting a combustible anchor particle allows the coal-particle complex to be used for energy production. As another example, selecting an ungelatinized starch particle as an anchor particle allows the formation of a coal-particle complex that can be formed into an energy-bearing pellet that responds to heating by expanding and becoming porous, facilitating rapid and efficient combustion.

In an embodiment, a fine powdered uncooked starch, e.g., ungelatinized, can be selected as anchor particles. A complementary pair of activator and tether agents are selected, whereby the starch particles can be coated with the tether agent and the coal fines can be coated with the activator. As an example, a polyelectrolyte pair including a polyanionic polymer and a polycationic polymer can be selected. The polyelectrolyte pair is selected to exhibit strong attraction to each other, even when surrounded with water molecules and other dissolved ions. Polyelectrolytes can be selected that are capable of spontaneous self-assembly on coal fines and starch particles, respectively, to deposit a monolayer or near-monolayer film on the fines and the particles.

In embodiments, the tethering agent is disposed upon the starch particles to form a tether-bearing anchor. The activator is added to the coal fines. The two fluid streams can then be mixed together, whereby the charge-charge attraction complexes the tether-bearing anchor particles with the activated coal fines, expelling intervening water molecules and precipitating macroscopic coal-starch aggregates.

In embodiments, polyanions including carboxymethyl cellulose (CMC), carboxymethyl starch (CMS), pectin, xanthan gum, alginate, polyacrylic acid, polymethacrylic acid, hydrolyzed polyacrylamide, styrene maleic anhydride copolymer, certain proteins and peptides rich in amino acids containing carboxylic acid side groups, and the like, can be used in the system. In embodiments, polycations including polyethyleneimine, chitosan, polyvinylamine, polyallylamine, polydimethyldiallylammonium chloride (PDAC), epi-dimethylamine (epi-DMA), and certain proteins and peptides rich in amino acids with side amino groups, and the like, can be used in the system. Other polyanion-polycation pairs, including those disclosed above, will be apparent to those of ordinary skill in the art.

In an embodiment, the coal fine slurry can be treated with one type of polyelectrolyte while a starch powder is lightly wetted with another (e.g., sprayed with or a concentrated dispersion of the starch powder is added to a dilute polyelectrolyte solution). The charged starch is then mixed with the coal slurry containing pre-coated coal fines covered with counter-charged polyelectrolyte. Since both solids have an ultrathin polymer layer on their surface, the strong charge-charge attraction immediately brings the disparate particles together, causing firm aggregation and precipitating cohesive pellets. Depending on the intensity of stirring, pellets of different but controlled size readily form. The consolidated aggregates can be easily recovered by passing the combined liquid stream over a coarse wire mesh. Clarified water devoid of either fine powder exits the system, posing little environmental concern. Mechanical pressure or vacuum can be applied to further dewater the solids. Since water is largely excluded from the interior of the pellets, little drying by heat is needed. In arid or semi-arid areas, pellets can dry rapidly at room temperature. Other adjuncts to the pellet formation process, such as adding starches and other pelletizing ingredients, are consistent with these systems and methods, as would be understood by those of ordinary skill in the art. In embodiments, additives to improve dewatering of the solids can be introduced using hydrophobic materials and practices known in the art.

In embodiments, the complexes formed from the ungelatinized-starch-coal-fines composite can be shaped into energy-bearing pellets that possess a unique performance feature: upon modest heating, the starch greatly expands (foams) leaving numerous interior channels for oxygen permeation. This rapid expansion can cause the pellets to disintegrate upon aggressive heating. Not to be bound by theory, it is understood that the thermal decomposition of the oxygen-rich sugar building blocks of starch can create oxygen radicals that can speed up combustion of nearby coal particles (which are typically difficult to burn due to their high aromaticity).

Other difficult-to-burn energy-containing particles can be similarly treated by the foregoing systems and methods so that they can be burned more efficiently. Solutions bearing such energy-containing materials (e.g., coke from coking of heavy crude or bitumen, lignin from pulping, shredded or pulverized recycled plastics/rubbers, fatty acids and waste oils/shortenings that are semi-solid-like) can be treated with activator polymers and complexed with tether-bearing anchor particles, e.g, starch particles as described above. Other tether-bearing anchor particles can be used to complex with the activated energy-containing material, such anchor particles being selected to enhance the combustion process or to effect other desirable chemical reactions. Alternatively, the energy-containing particles can be used as anchor particles, to be combined with other materials that have been activated, the other material being selected to enhance the combustion process or to effect other desirable chemical reactions.

In embodiments, more than two components can be complexed together using the foregoing systems and methods. One can therefore produce complexes of multiple materials designed to have desirable properties, such as more efficient combustion. For example, in an embodiment, lignin and coal dust can each be treated with PDAC while starch is activated with hydrolyzed polyacrylamide. When the dispersions of each component are brought together, a ternary complex can be formed, with lignin/coal commingled and "glued" with starch particles that later expand under heat. The surface monolayer interaction among all the components serves to bind them together and to provide cohesive strength to the pellet composite. In an embodiment, lignin and coke particles can be complexed with starch particles using these systems and methods.

In other embodiments, lignin and coal or coke can be combined as complexes without using coated starch particles. The lignin particles can be used as anchor particles, to be coated with a tethering agent; the coal slurry (dilute or otherwise) can be pretreated with the complementary activator polymer. When the two fluid streams are combined, spontaneous aggregation ensues.

In yet other embodiments, these systems and methods can be used to produce composite pellets containing inorganic solids. For example, alkaline solids (e.g., calcium oxide or magnesium oxide) can be compounded into the composite pellets. During pellet combustion, the aforesaid inorganic materials are converted to the respective carbonate, thus sequestering products of coal combustion such as $CO_2$ and $H_2S$. Thus the pelletized coal-based fuel formed in accordance with these systems and methods are able to capture some of their own undesirable combustion byproducts. Hence, pellets or other coal-based energy sources (e.g., briquettes) can be made to absorb noxious volatile products of combustion, an advantageous property for applications in closed spaces, or example, or in situations where pollution concerns are of particular importance.

In embodiments, the coal slurry is pretreated with a dispersant or other material to enhance the selective activation of coal fines only. This may prevent the loss of ultrafine coal. As described above, coarse and intermediate coal fractions can be cleaned using gravity separation processes, while froth flotation is used to clean minus 0.5 mm fines. However, current cleaning processes are not suited to clean coal particles of size less than minus 0.5 mm. To further compound the problem, mechanization of the coal mining process has resulted in increased production of such ultrafine coal that remains unrecovered in tailings streams.

To prevent loss of ultrafine coal, a selective recovery process can remove these coal particles from a solution containing coal particles along with other impurities. The process uses four additives: a Dispersant, an Activator, a Tether and an Anchor particle. The Activator, Tether and Anchor particle components have been described above. A Dispersant, in embodiments, can interact with particles or fines in a slurry or solution of suspended fines. Through interactions with the particles in a slurry, the dispersant can modify the surface properties of the particles; for example, the dispersant can alter the surface charge of the particles to increase the charge-charge repulsion between the fine particles. Dispersants can be either selective or non-selective. In the case of selective coal recovery, dispersants can selectively adsorb onto the non-coal particles, such as clays, to increase the stability of these particles in the slurry, thus increasing the ability for coal fines to be selectively aggregated. Some dispersants do not show selectivity and are able to alter the surface charge of both clays and coal fines. Selective dispersants can include the following materials: sodium polytriphosphate, sodium hexametaphosphate, sodium silicate, sodium polystyrene sulfonate, solystyrene maleic anhydride sulfonate. Other disperants can include materials such as dodecyl amine or sodium hydrogen phosphates. In addition to dispersants, other pretreatment materials can be added prior to activation to promote selective coal recovery. These materials can serve to increase the hydrophobicity of the coal fines or prepare the coal fines surfaces to interact with selective activators. Pretreatment materials can be from the following classes of molecules: hydrocarbon polymers, numerous oils, fatty acids, rubbers, and other hydrophobic acids. Specific examples include heavy oils, styrene-butadiene rubbers and similar rubber emulsions, naphthenic acid, and fatty acids.

In embodiments, the selective removal of coal particles from a solution can involve four steps. First, the Dispersant is added to coal and impurities, causing the impurities to separate away from the coal and disperse in the stream. Optionally, other pre-treatment agents can be used. In the next step, a small dose of the Activator polymer is added to the stream, causing only the coal to aggregate. Separately, as a third step, Anchor particles (e.g. clean coal) are treated with a Tether polymer. In the fourth step, the Tether-bearing Anchor Particles are added to the treated stream. When added to the Activated stream, the Tether-bearing Anchor particles quickly bind to the aggregated coal in the Activated stream, forming consolidated solids free of impurities. If clean coal has been used as an Anchor particle, the consolidated solids are formed as coal fines deposited on the clean particulate coal, i.e., a coal-on-coal consolidated solid. After these steps, consolidated coal solids can be recovered from the fluid stream.

EXAMPLES

The following materials were used in Examples 1-11 below:
Commercially available poly(acrylamide) (50% hydrolyzed), 15M MW
Poly(diallyldimethylammonium chloride) (pDADMAC) (20% w/v), Sigma Aldrich, St. Louis, Mo.
Coal slurry from a coal washing plant
Bagasse from the Louisiana sugar industry
Peanut shells from Whole Foods Grocery Store
Coal solids, 0.01-0.2 cm size fraction
Lignin powder, Sigma Aldrich, St. Louis, Mo.
Paper pulp from a bleached kraft mill
Corn starch Shaw's Grocery Store brand
Grass clippings from Cambridge, Mass.
Coal mine samples of filter cake and coal processing refuse Example 1

Activated Coal Slurry

Coal slurry was thoroughly mixed to ensure that a uniformly dispersed, homogeneous suspension is present. The coal slurry that was used contains 22% dry solids. To the slurry, an activator, 50% hydrolyzed poly(acrylamide), was added to yield a 113 ppm (activator to coal solids) concentration. The coal slurry with activator is gently mixed until visible flocculations ("flocs") are formed.

Example 2

Activated Coal Slurry+Tethered Bagasse

Commercial bagasse was dried and mechanically chopped or blended to produce solids of 1 cm in length or smaller. The dried, chopped bagasse was mixed with water and tethered with 500 ppm of pDADMAC. Activated coal slurry prepared in accordance with Example 1 was combined with the tethered bagasse in a ratio of 0.06:1 (bagasse to coal slurry dry solids). The tethered bagasse plus activated coal slurry solution was mixed for ~10 seconds and poured into a 250 mL graduated cylinder and allowed to settle for 15 minutes. The settling rate corresponded to approximately 8 ft/hr. The bed height compacted to approximately 63% of the initial volume of the mixture, and the turbidity of the supernatant was 221 Nephelometric Turbidity Units (NTU). A sample of the bagasse-coal solids was dabbed dry with paper towels, and the remaining wet solids contained approximately 54% dry solids. The solids can be air dried or dried by some other means to produce readily usable fuel.

Example 3

Activated Coal Slurry+Tethered Peanut Shells

Commercial peanut shells were mechanically chopped or blended to produce solids of 2 cm in size or smaller. The chopped peanut shells were mixed with water and tethered with 500 ppm of pDADMAC. Activated coal slurry prepared in accordance with Example 1 was combined with the tethered peanut shells in a ratio of 0.06:1 (peanut shells to coal slurry dry solids). The tethered peanut shells plus activated coal slurry solution was mixed for ~10 seconds and poured into a 250 mL graduated cylinder and allowed to settle for 15 minutes. The settling rate corresponded to approximately 4 ft/hr. The bed height compacted to approximately 60% of the initial volume of the mixture, and the turbidity of the supernatant was 27 NTU. A sample of the peanut shells-coal solids was dabbed dry with paper towels, and the remaining wet solids contained approximately 51% dry solids. The solids can be air dried or dried by some other means to produce readily usable fuel.

Example 4

Activated Coal Slurry+Tethered Coal

Coal chunks were mechanically crushed to produce solids of 0.2 cm in length or smaller. The crushed coal was mixed with water and tethered with 500 ppm of pDADMAC. Activated coal slurry prepared in accordance with Example 1 was combined with the tethered crushed coal in a ratio of 0.51:1 (crushed coal to coal slurry dry solids). The tethered crushed coal plus activated coal slurry solution was mixed for ~10 seconds and poured into a 250 mL graduated cylinder and allowed to settle for 15 minutes. The settling rate corresponded to approximately 11 ft/hr. The bed height compacted to approximately 56% of the initial volume of the mixture, and the turbidity of the supernatant was 473 NTU. A sample of the coal-coal solids was dabbed dry with paper towels, and the remaining wet solids contained approximately 61% dry solids. The solids can be air dried or dried by some other means to produce readily usable fuel.

Example 5

Activated Coal Slurry+Tethered Lignin

Lignin powder was mixed with water and tethered with 500 ppm of pDADMAC. Activated coal slurry prepared in accordance with Example 1 was combined with the tethered lignin in a ratio of 0.51:1 (lignin to coal slurry dry solids). The tethered lignin plus activated coal slurry solution was mixed for ~10 seconds and poured into a 250 mL graduated cylinder and allowed to settle for 15 minutes. The settling rate corresponded to approximately 6 ft/hr. The bed height compacted to approximately 65% of the initial volume of the mixture. A sample of the lignin-coal solids was dabbed dry with paper towels, and the remaining wet solids contained approximately 57% dry solids. The solids can be air dried or dried by some other means to produce readily usable fuel.

Example 6

Activated Coal Slurry+Tethered Pulp

Commercial paper pulp was mixed with water overnight and tethered with 500 ppm of pDADMAC. Activated coal slurry prepared in accordance with Example 1 was combined with the tethered paper pulp in a ratio of 0.58:1 (wet pulp to coal slurry dry solids). The tethered pulp plus activated coal slurry solution was mixed for ~10 seconds and poured into a 250 mL graduated cylinder and allowed to settle for 15 minutes. The settling rate corresponded to approximately 5 ft/hr. The bed height compacted to approximately 71% of the initial volume of the mixture, and the turbidity of the supernatant was 109 NTU. A sample of the pulp-coal solids was dabbed dry with paper towels, and the remaining wet solids contained approximately 51% dry solids. The solids can be air dried or dried by some other means to produce readily usable fuel.

Example 7

Activated Coal Slurry+Tethered Starch

Commercial corn starch was mixed with water and tethered with 500 ppm of pDADMAC. Activated coal slurry prepared in accordance with Example 1 was combined with the tethered starch in a ratio of 0.53:1 (starch to coal slurry dry solids). The tethered starch plus activated coal slurry solution was mixed for ~10 seconds and poured into a 250 mL graduated cylinder and allowed to settle for 15 minutes. The settling rate corresponded to approximately 2 ft/hr. The bed height compacted to approximately 69% of the initial volume of the mixture, and the turbidity of the supernatant was 803 NTU. A sample of the starch-coal solids was dabbed dry with paper towels, and the remaining wet solids contained approximately 56% dry solids. The solids can be air dried or dried by some other means to produce readily usable fuel.

Example 8

Activated Coal Slurry+Tethered Grass Clippings

Grass clippings were dried and mechanically chopped or blended to produce solids of 1 cm in length or smaller. The dried, chopped grass clippings were mixed with water and tethered with 500 ppm of pDADMAC. Activated coal slurry prepared in accordance with Example 1 was combined with the tethered grass clippings in a ratio of 0.06:1 (grass clippings to coal slurry dry solids). The tethered grass clippings plus activated coal slurry solution was mixed for ~10 seconds and poured into a 250 mL graduated cylinder and allowed to settle for 15 minutes. The settling rate corresponded to approximately 7 ft/hr. The bed height compacted to approximately 64% of the initial volume of the mixture, and the turbidity of the supernatant was 387 NTU. A sample of the grass clippings-coal solids was dabbed dry with paper towels, and the remaining wet solids contained approximately 52% dry solids. The solids can be air dried or dried by some other means to produce readily usable fuel.

Example 9

Activated Coal Slurry+Tethered Peanut Shells, Filtration

A solution containing tethered peanut shells plus activated coal slurry solution, all prepared in accordance with Example 3, was mixed for ~10 seconds and poured into a filtration unit with a 80 mesh stainless steel screen. When mild vacuum was applied to the mixture, the filtration process took 40 seconds. The turbidity of the filtrate was 75 NTU. A sample of the retentate (peanut shells-coal solids) contained approximately 48% dry solids. The solids can be air dried or dried by some other means to produce readily usable fuel.

Example 10

Activated Coal Slurry+Tethered Pulp, Filtration

A solution of tethered pulp plus activated coal slurry solution, all prepared in accordance with Example 6, was mixed for ~10 seconds and poured into a filtration unit with a 80 mesh stainless steel screen. When mild vacuum was applied to the mixture, the filtration process took 37 seconds. The turbidity of the filtrate was 122 NTU. A sample of the retentate (pulp-coal solids) contained approximately 48% dry solids. The solids can be air dried or dried by some other means to produce readily usable fuel.

Example 11

Activated Coal Slurry+Tethered Filter Cake Coal (FC) or Coal Processing Refuse (CPR)

For each experiment in this Example, a sample of FC or CPR was used as anchors. For each sample, a dilute solution of the tethering polymer (p-DADMAC) was added at 500 ppm based on solids, and mixed. Activated coal slurry was prepared in accordance with Example 1. The tethered FC or CPR was added to the activated coal slurry and was gently mixed. The mixture was then gravity filtered through a filtration unit having a 80 mesh stainless steel screen. The time of filtration for each sample was measured starting from the time that the activated coal/tethered CPR or FC mixture was poured on the filter mesh. The solids residing on the mesh were analyzed while resident on the screen, using a moisture analyzer. An aliquot of the resident solids was blotted dry with paper towels to remove externally adherent water drops and was then analyzed to determine the dry solids content. The results of these experiments are set forth in Table 1 below.

TABLE 1

| Sample | Anchor:Fines (g:g) | Filtration Time (s) | Filtrate Turbidity (NTU) | Dry Solids (%) | Dry Solids Dabbed (%) |
|---|---|---|---|---|---|
| FC-1 | 0.5:1 | 67 | 23 | 59 | 66 |
| CPR-1 | 0.5:1 | 152 | 274 | 60 | 65 |
| CPR-2 | 1:1 | 66 | 20 | 66 | 79 |

For each sample, the solids resident on the filter mesh were compact and self-adherent. For certain samples, the solids could be easily scraped or removed from the filter in one or two pieces. The filtrate for all samples had low turbidity values, with samples FC-1 and CPR-2 having extremely low turbidity values of 23 NTU and 20 NTU, respectively. The photograph in FIG. 1 shows the filtrate for each sample, and the solids that were removed from the filter for each sample.

After performing the measurements above, the integrity and cohesiveness of the solid material on the filter mesh was tested by pouring a large amount of water onto the solids resident on the mesh. Vacuum was applied and water was refiltered through the solids. Filtration time and turbidity of filtrate were measured, and the solid samples were examined. For each sample, the resident solids appeared stable and cohesive. The CPR-2 sample's second filtration time was under three minutes and the filtrate had an even lower turbidity of 8.5 NTU, while the FC-1 sample took 17 minutes to filter and the filtrate had a slightly higher turbidity value of 34 NTU. These experiments suggest that the consolidated solids prepared in accordance with this protocol retain their integrity even after exposure to water washing, as might occur, for example, with heavy rains, and there is no evidence of significant redispersion of the particles in the water.

For each sample, the remaining solids were oven-dried and examined thereafter for consistency and cohesiveness. For each sample, a solid and apparently geotechnically stable dried mass resulted from oven-drying.

Example 12

Tailings Treatment with Pre-treatment Agents

The following materials were used for this example:
1) Activator/tether polymers as set forth in Table 12.1:
2) Pre-treatment agents as set forth in Table 12.2:

TABLE 12.1

Polymers used as activators/tethers for treatment of coal tailings

| Polymer | Manufacturer | Charge | Charge Density | Molecular Weight (g/mol) |
|---|---|---|---|---|
| Magnafloc 10 | Ciba Corporation | Anionic | 10% | High |
| Magnafloc LT30 | Ciba Corporation | Anionic | 50% | High |
| Airflex 420 | Air Products | Non-ionic | — | High |
| Ropaque Ultra E | Dow | Non-ionic | — | High |
| Michem ME 39235 | Michelman | Non-ionic | — | High |
| PDAC (polydimethyl-diallylammonium chloride) | Sigma-Aldrich | Cationic | 100% | 400,000-500,000 |

Solutions of the above polymers were prepared and kept at room temperature. All solutions were prepared at 0.1 wt % concentration using DI water.

TABLE 12.2

Pre-treatment agents used for selective flocculation of coal in coal tailings

| Pre-treatment Agent | Manufacturer | Concentration (wt %) |
|---|---|---|
| Sodium Hexametaphospate | Ciba Corporation | 10 |
| Benzoic Acid | Sigma-Aldrich | 0.1 |
| Naphthenic Acid | Sigma-Aldrich | 0.1 |
| Prosoft TQ 2028 | Hercules | 1.0 |
| Heavy oil | — | 100 |

All the pre-treatment agents in Table 2 were prepared using DI water and kept at room temperature.
3) Coal Tailings obtained from operating coal mine with an ash content of approximately 50%, comprising:
   5 wt % coal,
   5 wt % clay, and
   90 wt % water.
4) Anchor Particles, obtained from operating coal mine at two different stages of operation (filter cake, with ash content of approximately 13%, and coal processing refuse, with ash content of approximately 80%):
   Filter cake (FC) composition, approximately:
   68 wt % coal,
   10 wt % clay, and
   22 wt % water.
   Coal processing refuse (CPR) composition, approximately
   17 wt % coal,
   63 wt % clay, and
   20 wt % water.

Coal tailings samples obtained from an operating mine were agitated with an overhead mixer before testing to re-suspend salt and clay particulate matter that may have settled during shipment. The test samples were then treated using Sodium hexametaphosphate (SHMP) as a dispersant. In addition, to SHMP, other pretreatment agents were added in certain experiments. After the pretreatment addition to each coal tailings sample, it was mixed by inverting the container 20 times. Polymers from Table 12.1 were used as activators or tethers for further treatment of the coal tailings sample. When a polymer was selected for use as an Activator, a different polymer was chosen for use as a Tether. After the pretreatment phase, an Activator polymer was added to the coal tailings sample, and the solution was mixed by inverting the container 10 times. The Tether-bearing anchor particles were prepared separately, by mixing the selected Tether polymer with the FC or CPR Anchor particle. The Anchor particle was used in a 1:1 ratio (dry anchor mass to dry coal fines in slurry) with the solids content in the coal tailings. After adding the Tether-bearing Anchor particles to the coal tailing sample, the solution was again mixed by inverting the container 10 times. The treated solution was allowed to settle for five minutes before siphoning out the supernatant water. Afterwards, both the supernatant and the sediment were dried in an oven at 80° C. overnight. The ash contents of the dried samples were then determined according to the guidelines of ASTM D3174-04.

The results of a set of experiments (Experimental Set 1) using SHMP as Dispersant, Magnafloc 10 as Activator, and PDAC as Tether are shown below in Table 12.3 below. For this set of experiments, CPR was used as the Anchor particle. For this set of experiments, naphthenic acid was used as a pretreatment in some of the tests. Benzoic acid was also used as a pretreatment agent, with similar results, although Table 12.3 does not provide the data for the tests using benzoic acid as a pretreatment.

TABLE 12.3

Ash content values of sediment from Experimental Set 1

| # | SHMP (ppm) | Pretreatment and Dosage (ppm) | MF10 (ppm) | PDAC (ppm) | Ash Content (%) |
|---|---|---|---|---|---|
| 1 | — | Naphthenic acid, 500 | 1000 | 1000 | 65.3 |
| 2 | 1000 | Naphthenic acid, 500 | 25 | 25 | 68.7 |
| 3 | 1000 | Naphthenic acid, 500 | 1000 | 1000 | 67.6 |
| 4 | 1000 | — | 1000 | 1000 | 64.8 |
| 5 | 2000 | — | 1000 | 1000 | 68.7 |
| 6 | 30000 | — | 1500 | — | 68.5 |
| 7 | 30000 | — | 1500 | 1500 | 65.8 |
| 8 | 30000 | Na$_2$CO$_3$, 12500 | 1000 | 1000 | 64.9 |
| 9 | 30000 | — | 1000 | 1000 | 67.0 |

Figure 2B:
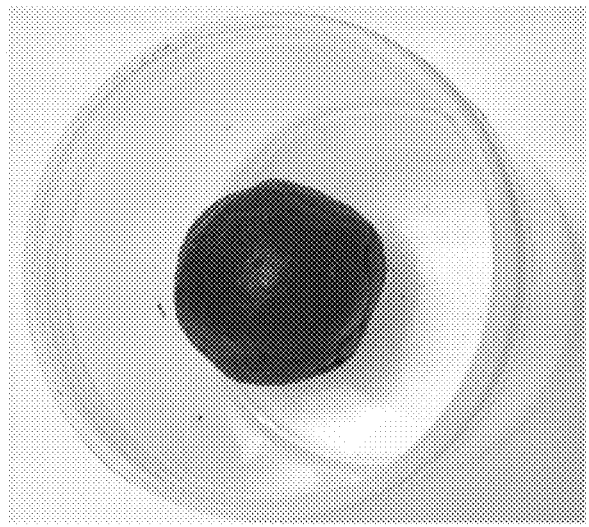
FIG. 2B shows recovered solids from FIG. 2A transferred to a plastic container after dabbing with paper towel.
Figure 2A:
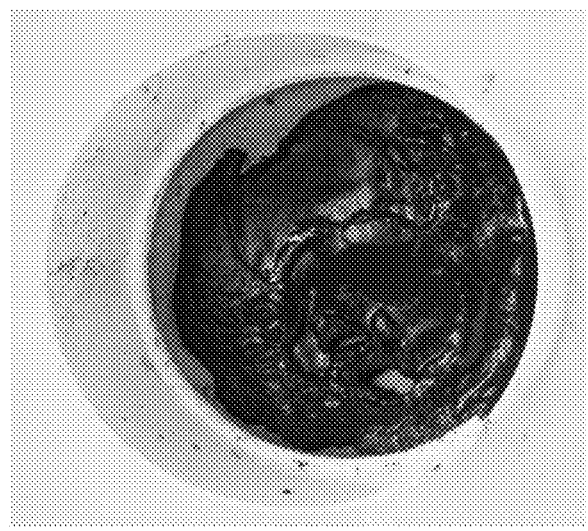
FIG. 2A shows recovered solids after ATA treatment according to Example 12 and gravity filtration on a mesh screen.

The sediment from Test 1 in Table 12.3 was filtered over a mesh screen and dabbed dry with a paper towel. The samples, shown in FIGS. 2A and 2B, demonstrate that the solids obtained after gravity filtration are stable, with good mechanical integrity.

The results of a set of experiments (Experimental Set 2) using SHMP as Dispersant and Prosoft TQ 2028 as pretreatment agent are shown in Table 12.4 below. In these experiments, heavy oil is coated onto the FC coal anchor particles (1 wt %) using FlackTek SpeedMixer™ at 3000 rpm for three minutes. The oil-coated FC particles then acted as the tether-coated Anchor particles.

TABLE 12.4

Ash content values of sediment from Experimental Set 2

| # | SHMP (ppm) | GPA (ppm) | Activator & Dosage (ppm) | Tether | Ash Content (%) |
|---|---|---|---|---|---|
| 10 | 30000 | 1500 | — | 1% oil | 14.9 |
| 11 | 30000 | 1500 | PEO, 1500 | 1% oil | 13.4 |

The results of a set of experiments (Experimental Set 3) using SHMP as the Dispersant, and non-ionic Activators in conjunction with non-ionic Tethers are shown in Table 12.5 below. In certain of these experiments, sodium dodecyl sulfate (SDS) was used as a pretreatment agent, added after the SHMP to enhance the hydrophobicity of the coal. In certain of these experiments, where SHMP was used as the dispersant in conjunction with Ropaque Ultra E as activator and heavy-oil-coated CPR particles (test #14) as tether-bearing Anchor, the resulting solution was segregated into layers. The oil-coated anchors float at the surface, and the remaining solids settled to the bottom, leaving a layer of cloudy water in between. When Airflex 420 and Michem ME 39235 were used as Activators (data not shown), there was a similar formation of layers. Using these latter two Activators without the SHMP dispersant gave similar results.

TABLE 12.5

Ash content values of sediment from Experimental Set 3

| # | SHMP (ppm) | SDS (ppm) | Activator & Dosage (ppm) | Tether & Dosage (ppm) | Ash Content (%) |
|---|---|---|---|---|---|
| 12 | 30000 | — | PEO, 1000 | Ropaque, 1000 | 62.3 |
| 13 | 30000 | 1000 | PEO, 1000 | 1% oil | 60.0 |
| 14 | 30000 | — | Ropaque, 1000 | 1% oil | 60.0 |
| 15 | 30000 | — | Polystyrene, 1000 | 1% oil | 61.4 |

The data set forth in this Example show that, when using CPR particles as anchor, the ash content of the consolidated solids in the experiments above can range from approximately 50% to 68%, the former representing consolidation of only coal in the sample, while the latter representing consolidation of both coal and impurities. The ash contents from tests #12-15 (Table 5) fall between the two values, indicating that coal consolidation has been achieved with some selectivity against impurities.

Equivalents

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for removing coal fines from a fluid, comprising:
   adding a dispersant to the fluid, wherein the dispersant is selected from the group consisting of sodium polytriphosphate, sodium hexametaphosphate, sodium silicate, sodium polystyrene sulfonate, polystyrene maleic anhydride sulfonate, dodecyl amine and sodium hydrogen phosphate;
   after addition of the dispersant, adding an activator polymer to the coal fines in the fluid to form activated coal fines, wherein the activator polymer is an anionic or cationic polymer that interacts with the population of coal fines;
   complexing an anchor particle with a tethering polymer capable of complexing with the activated coal fines, wherein the anchor particle is a combustible particle and wherein the tethering polymer is anionic or cationic polymer, thereby forming tether-bearing anchor particles;
   mixing the tether-bearing anchor particles with the activated coal fines to form a composite material comprising coal fines and the anchor particles, wherein said composite is combustible; and removing the composite material from the fluid;

wherein when the activator polymer is a cationic polymer, the tethering polymer is an anionic polymer and when the activator polymer is an anionic polymer, the tethering polymer is a cationic polymer.

2. The method of claim 1, wherein the anchor particle comprises coal.

3. The method of claim 2, wherein the anchor particle comprises filter cake coal.

4. The method of claim 1, wherein the anchor particle is derived from coal processing.

5. A method for removing coal fines from a fluid, comprising:

adding a pretreatment agent to the coal fines, wherein the pretreatment agent is selected from the group consisting of a hydrocarbon polymer, oils, rubbers, and a fatty acid or other hydrophobic acid;

after addition of the pretreatment agent, adding an activator polymer to the coal fines in the fluid to form activated coal fines, wherein the activator polymer is an anionic or cationic polymer that interacts with the population of coal fines;

complexing an anchor particle with a tethering polymer capable of complexing with the activated coal fines, wherein the anchor particle is a combustible particle and wherein the tethering polymer is anionic or cationic polymer, thereby forming tether-bearing anchor particles;

mixing the tether-bearing anchor particles with the activated coal fines to form a composite material comprising coal fines and the anchor particles, wherein said composite is combustible; and removing the composite material from the fluid;

wherein when the activator polymer is a cationic polymer, the tethering polymer is an anionic polymer and when the activator polymer is an anionic polymer, the tethering polymer is a cationic polymer.

6. The method of claim 5, wherein the pretreatment agent is selected from the group consisting of a styrene-butadiene rubber, naphthenic acid, and a fatty acid.

7. The method of claim 5, wherein the anchor particle is derived from coal processing.

8. The method of claim 5, wherein the anchor particle comprises coal.

\* \* \* \* \*